Sept. 7, 1937.  J. R. HEIDLOFF  2,092,251
BRAKE
Filed March 18, 1933  2 Sheets-Sheet 1

INVENTOR.
JOSEPH R. HEIDLOFF
BY Jerome R. Cox
ATTORNEY

Patented Sept. 7, 1937

2,092,251

UNITED STATES PATENT OFFICE 2,092,251

BRAKE

Joseph R. Heidloff, South Bend, Ind., assignor to Bendix Aviation Corporation, South Bend, Ind., a corporation of Delaware Application March 18, 1933, Serial No. 661,612

3 Claims. (Cl. 60—54.6)

This application relates to brakes for automotive vehicles and most particularly to brake systems employing hydraulic actuating means.

One of the objects of the invention disclosed herein is to insure the adequate supply of liquid to the system at all times and to eliminate air and other gases from the operating parts.

A further object of the invention is to provide simple and efficient means for filling the system with liquid and for eliminating air therefrom when the system is first placed in operation.

A further object is to provide a simple system in which the liquid is normally under superatmospheric pressure whereby the tendency of air to leak in is minimized.

A feature of the invention is the specific arrangement of an auxiliary chamber within the master cylinder connected with the reservoir and having two ports leading to the master cylinder, one of which is controlled by a check valve.

A further feature of the invention is the combination of a check valve interposed between the master cylinder and the conduits leading to the wheel cylinders and a screw designed normally to make the valve inoperative.

A further feature is the specific spring pressed plunger which maintains the liquid in the reservoir under pressure at all times.

Further features and objects of the invention will be apparent after a reading of the subjoined specification and claims and after consideration of the accompanying drawings, in which:

Figure 1:
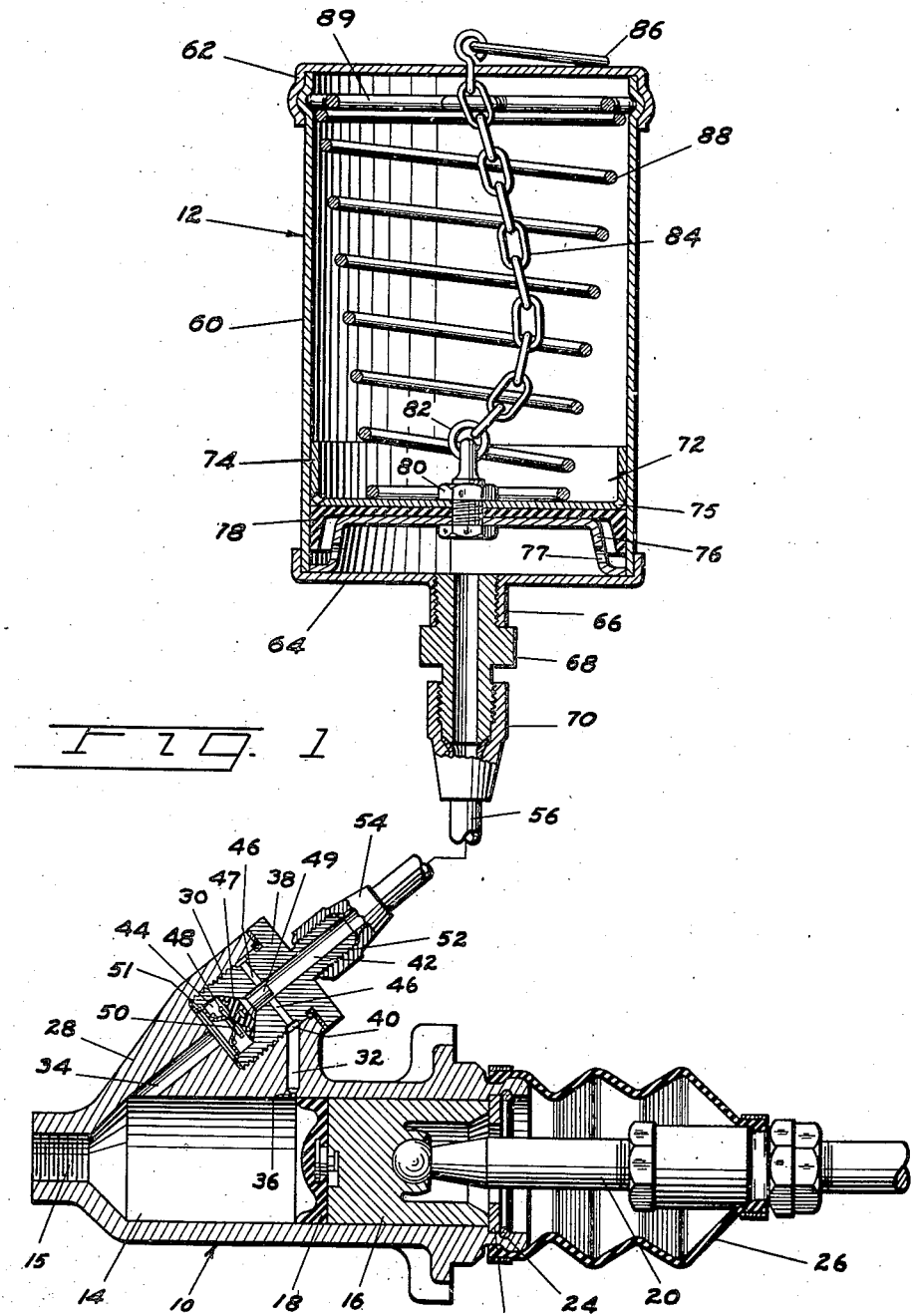
Figure 1 is a view showing in section a master cylinder and a reservoir constructed according to my invention.

Referring particularly to Figure 1 of the drawings I have shown a master cylinder 10 and a reservoir 12. The master cylinder is formed with a pressure chamber 14 and with an outlet 15 through which liquid is adapted to flow out to the brake operating motor or motors. Adapted to be reciprocated in the pressure chamber 14 is a piston 16 having associated therewith a rubber packing cup 18. The packing cup is secured to the piston by a metallic button 19 molded in the rubber and having a flange fitting in an eccentric locking slot formed in the piston. When the parts are not assembled the button may be inserted in the locking slot from one side, but after assembly cannot come loose. The piston is reciprocated through a piston rod 20 secured for substantially universal movement to the rear end thereof. The piston rod may be operated by any suitable means, as for instance by a foot pedal. The rear end of the cylinder 10 is provided with a washer 22 held in place by a spring ring 24 and serving to limit the rearward movement of the piston 16. There is also provided for the rear end of the piston a flexible boot 26 which serves to keep out dust, etc.

The master cylinder is provided with an inclined projection 28 which is formed with a threaded recess 30. There are also formed in the projection 28 a pair of bores or inlet ports 32 and 34. The former extends radially of the cylinder and terminates at its lower end in a very small opening 36 leading to the pressure chamber 14 just in advance of the normal position of the cup 18. The latter is inclined substantially concentric with the projection 28 and leads to the front of the pressure chamber 14. Screwed into the recesss 30 is a threaded plug 38 which is formed with an annular groove 40, a central passageway 42 and a concentric tapered recess 44.

The annular groove 40 is designed to register with the port 32 and is connected by radial ports such as 46 with the passageway 42. Positioned in the recess 44 is a check valve formed by a tapered rubber disk packing 47 normally seated on the tapered shoulder of the recess 44 and urged toward its seat by a spring 48. The valve has molded into it when formed a guide plug 49 which extends into the smaller portion of the passageway. The spring 48 bears at its opposite end on a guide disk 50 held in place in plug 38 by spring clip 51.

The outer end of plug 38 is formed with a threaded portion 52 on which is secured a coupling 54 by which the plug is secured to a conduit 56 leading to the reservoir 12.

The reservoir 12 is designed to keep a reserve supply of liquid. It is formed by a light cylinder 60 provided with upper and lower end caps 62 and 64 respectively. The lower cap 64 is formed with an annular flange 66 into which is screwed the bored plug 68. The upper end of the conduit 56 is secured to the plug 68 by means of a coupling 70.

Within the reservoir 12 is a piston 72 formed by metallic guides 74 and 76 positioned on each side of rubber cup 78 and clamped to each other by the bolt 80. The guide 74 is formed with apertures 75 and the guide 76 is formed with apertures 77. The guide 76 also serves to limit the downward movement of the piston. The bolt 80 is provided with a ring 82 to which is secured the lower end of a chain 84. The upper end of the chain 84 is secured to the upper cap 62 which is in turn secured to a pull ring 86. By means of the ring 86 the piston 72 may be raised to the top of the reservoir. A spring 88 bears at its lower end on piston 72 and at its upper end on a locking ring 89.

Figure 2:
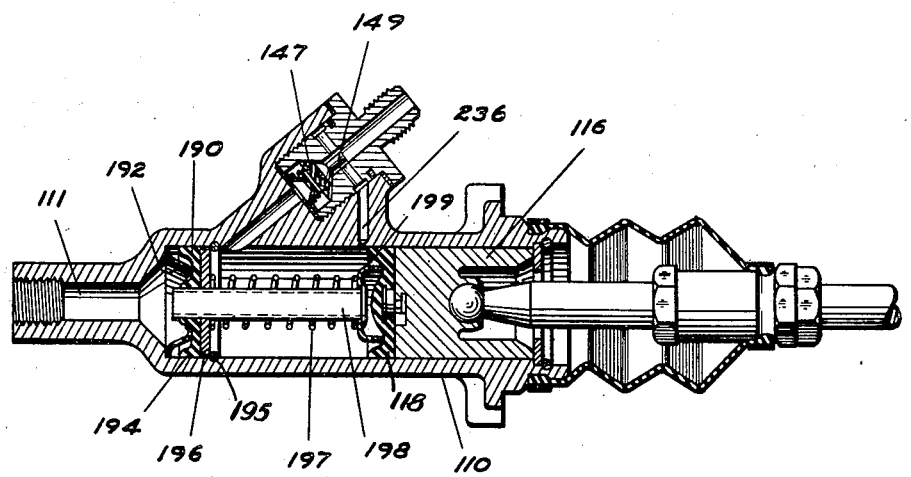
Figure 2 is a sectional view showing an alternate form of master cylinder.

The master cylinder 110 shown in Figure 2 may be used with or without a spring pressed piston in the reservoir similar to 72. It is provided with a check valve 190 positioned in the front end thereof. The valve is formed by an annular perforated metallic guide 192, an annular rubber cup 194 and an annular metallic washer 196, the latter having a diameter smaller than the internal diameter of the cylinder and smaller than the diameter of the rubber cup 194 yet larger than the inner diameter of the spring clip stop 195 retained in a groove in the cylinder wall. A hollow tube 198 is adapted to slide through the guide cup and washer and serves as a guide for a spring 197 bearing at its forward end on the valve 190 and at its rear end on a metal cup 199 which is associated with the rear end of the tube. The cylinder 110 is formed with an extension 111 into which the guide tube 198 is adapted to extend when the piston 116 is pushed forward.

Figure 3:
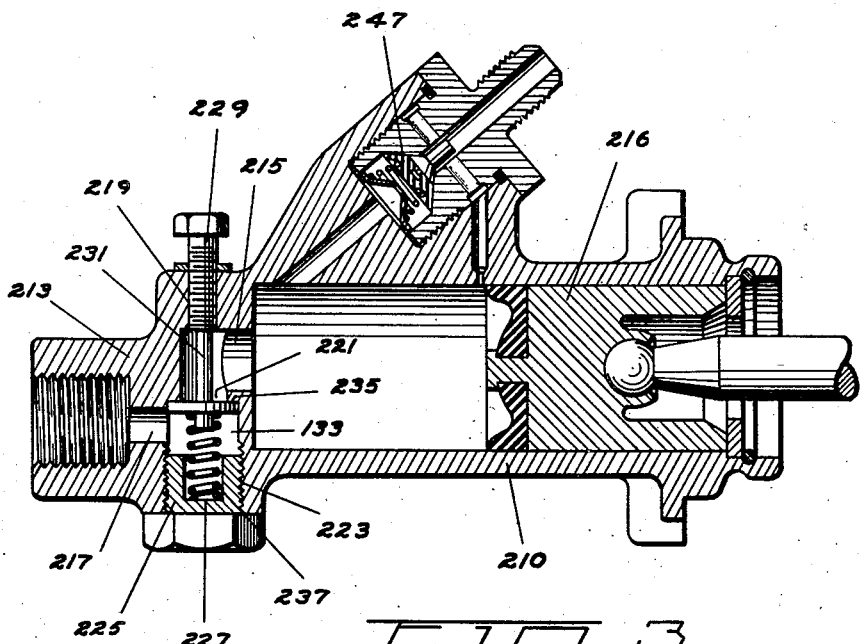
Figure 3 is a sectional view showing a third form of master cylinder.

The master cylinder shown in Figure 3 also may be used with or without the spring pressed piston in the reservoir. The cylinder 210 is formed with a partition 213. The partition is formed with non-aligned bores 215 and 217 each extending longitudinally of the cylinder and only partially through the partition. Extending through the partition and through the sides of the cylinder are aligned radial bores 219, 221 and 223, the first having the smallest diameter and the last having the largest. A threaded plug 225 having a recess 227 closes the bore 223 and a screw 229 formed with an extension 231 extends through the bore 219. A valve member 233 rests on a valve seat 235 formed at the lower side of the bore 221 and is urged toward closed position in contact with said seat by a spring 237. The spring has its outer end positioned in recess 227.

The operation of the devices disclosed is as follows: Assume that the braking system is empty. The ring 86 together with the cover 62 is lifted from the reservoir 12 and brake fluid is poured in substantially to the top of the reservoir. The cover 62 together with the ring 86 is raised further thus acting through the chain 84 to raise the piston 72. Fluid is by-passed below the piston through the ports 75 and 77 and past the cup 79.

When piston 72 has been raised to the top of the reservoir 12, the ring 86 is released which causes the piston to exert pressure on the liquid in the reservoir and force the liquid through the conduit 56 to the master cylinder 10 passing through ports 46 and 32 and possibly forcing valve 47 from its seat. If the system is not completely filled the process may be repeated. The process may be expedited by operating master piston 16, thus pumping liquid past valve 47. When the system has been filled with liquid the brakes are operated by operating master piston 16 in the usual way. If, however, the master piston should return more rapidly than fluid from the wheel cylinder, a surplus of fluid is admitted into the master cylinder. Should the amount of liquid in the master cylinder be too large, the excess flows back to the reservoir by way of ports 32 and 46.

In filling the system shown in Figure 2, operation of the piston 116 pumps liquid from the reservoir through the valve 147 and past the valve 190. This is effective even if the piston 116 is not allowed to return to uncover the port 236. The piston 116 on its rearward stroke draws liquid into the pressure chamber past the check valve 147. On the forward stroke the check valve 147 closes and the liquid is forced past the cup 190 which serves as a second valve. Thus the cylinder acts just as a pump, being provided with the two valves 147 and 190 between which the piston 116 is adapted to reciprocate. During normal operation excess liquid ahead of the valve 190 may escape (when the piston is at its rearward position) through the tube 198. The metal cup 199 normally seats upon the rubber cup 113, being held there by the spring 197. However, whenever the pressure in the system ahead of the cup 190 exceeds that rearward of the valve 190 plus the pressure of the spring 197, this pressure (being present also in the cup 199 by reason of the connection through the tube 198) is adapted to raise the cup 199 from its seat and to allow the escape of liquid back into the pressure chamber. Thus liquid is allowed to return upon the release of the brakes. If the parts are in their normal released position, the liquid then escapes through the port 236 back to the reservoir. The valve formed by the cup 199 thus serves as a check valve when operating the brakes as well as when priming the system.

Similarly, operation of the piston 216 pumps liquid through the valve 247 and past the valve 233. After the system is filled with liquid, the screw 229 is threaded further in and the extension 231 forces the valve 233 from its seat into the bore 223 and during the normal operation of the system maintains the valve open. The valve 235 thus serves as a check valve when priming the system.

It is to be understood that the above described embodiments of my invention are for the purpose of illustration only and various changes may be made therein without departing from the spirit and scope of the invention.

I claim:

1. In hydraulic brake apparatus, a master cylinder having an outlet leading to the brakes, a piston in said cylinder, a valve associated with said outlet, and a screw normally bearing on said valve to maintain the outlet open, said cylinder having a radial bore and a recessed plug screwed into said bore, and said valve having a spring seated within said recess for urging it to closed position except when pressure is applied thereto from within said master cylinder or when said valve is held open by said screw.

2. In hydraulic brake apparatus, a master cylinder having an outlet leading to the brakes, a piston in said cylinder, a valve associated with said outlet, a spring for urging said valve toward closed position, and a screw normally bearing on said valve to maintain the outlet open.

3. In a hydraulic brake apparatus, a master cylinder formed with a pressure chamber with a recess formed on one of the outer faces thereof, and with a pair of inlet ports leading from said recess to said chamber, and having an outlet leading to the brakes; a piston in said pressure chamber; a valve associated with said outlet; a spring for urging said valve toward closed position; a screw normally bearing on said valve to maintain the outlet open; and a valve for controlling one of said inlet ports, said last named valve comprising a plug secured in said recess and formed with a passageway having a tapered shoulder, a guide plug extending within the smaller portion of said passageway, a rubber tapered disk adapted to bear on said shoulder and molded around said guide plug; and a spring bearing on said disk.

JOSEPH R. HEIDLOFF.